June 11, 1929.  S. A. NEIDICH  1,717,118
APPARATUS FOR DEHYDRATING VISCOSE PRODUCTS
Filed June 21, 1926  2 Sheets-Sheet 1
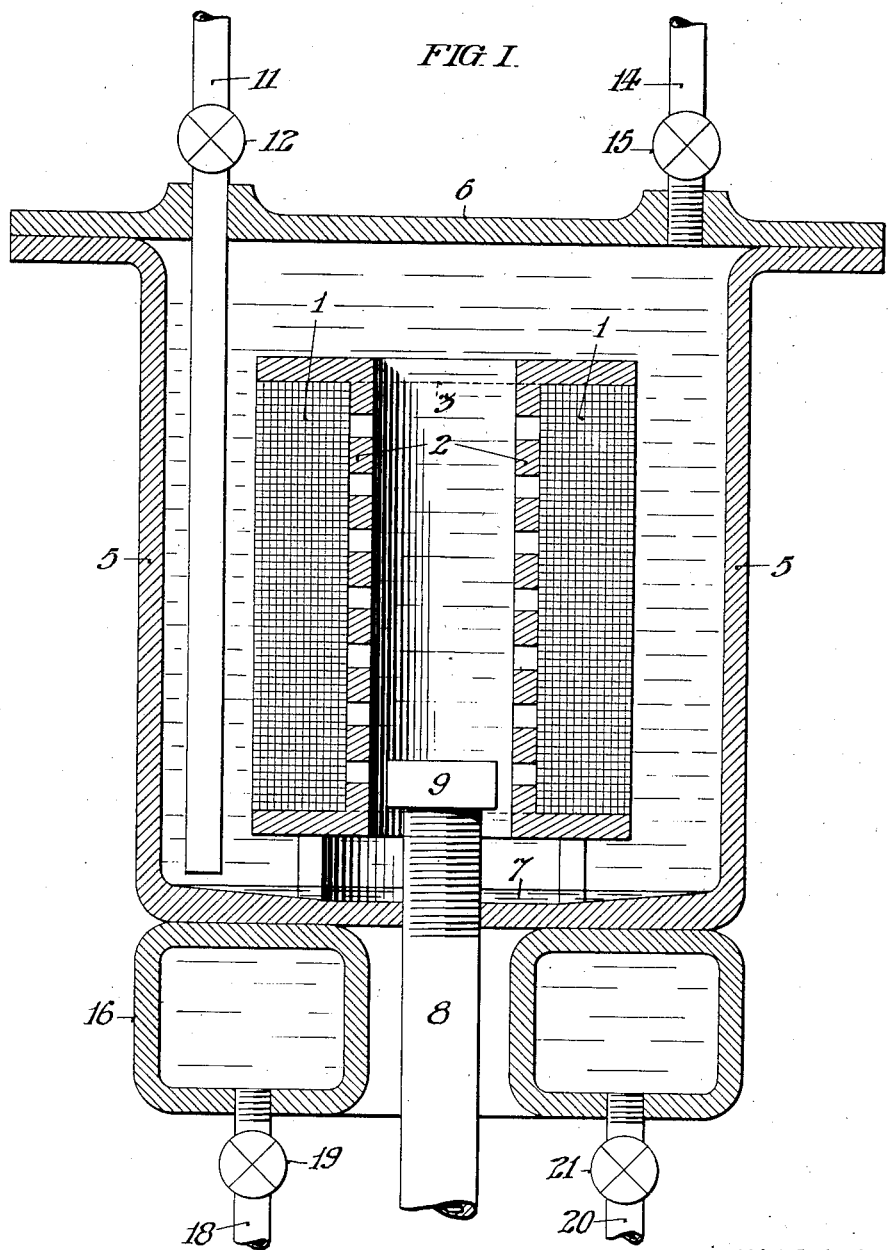
INVENTOR:
Samuel A. Neidich, June 11, 1929.  S. A. NEIDICH  1,717,118
APPARATUS FOR DEHYDRATING VISCOSE PRODUCTS
Filed June 21, 1926  2 Sheets-Sheet 2
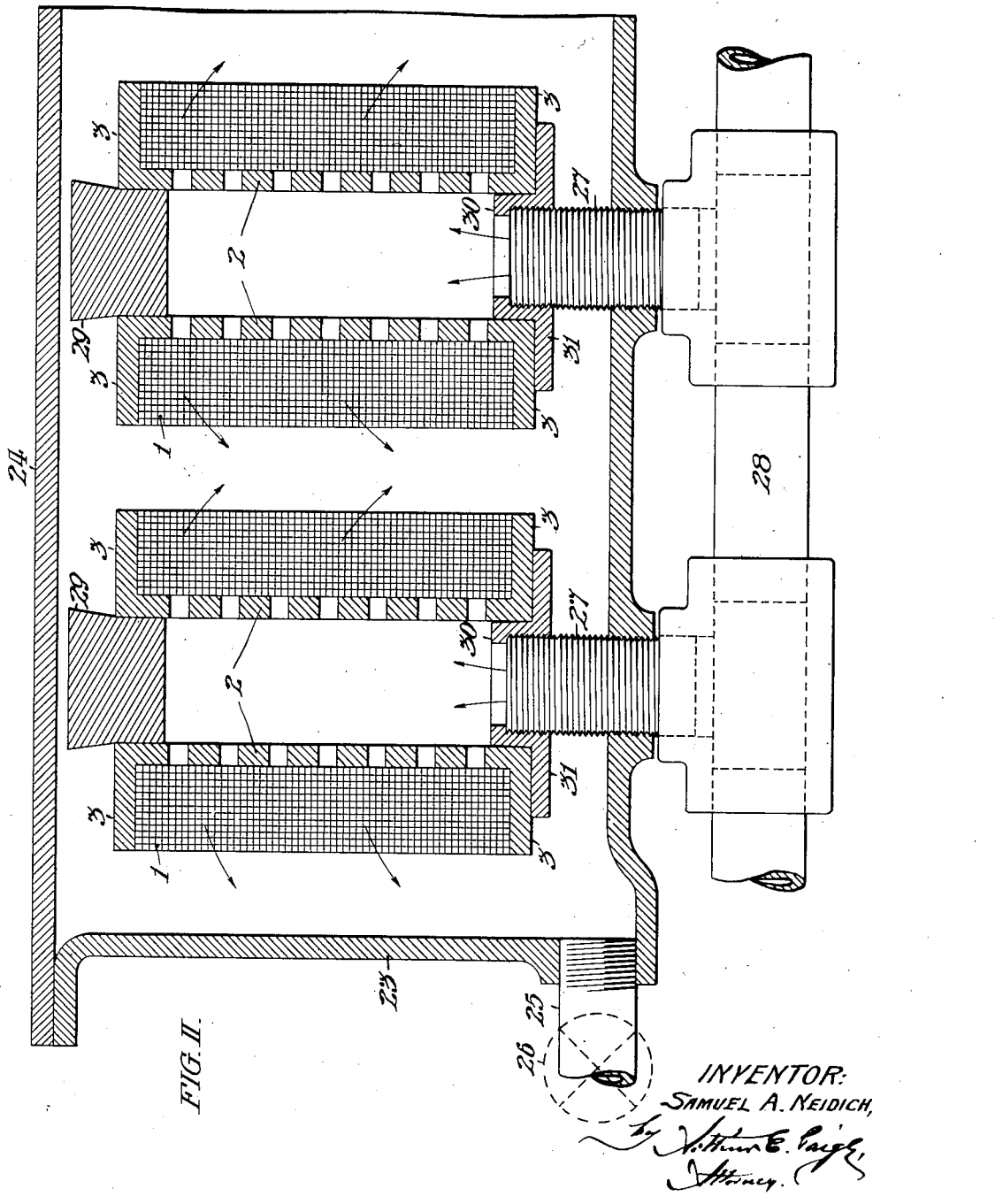
FIG. II.
INVENTOR:
SAMUEL A. NEIDICH, Patented June 11, 1929.

1,717,118

UNITED STATES PATENT OFFICE.

SAMUEL A. NEIDICH, OF EDGEWATER PARK, NEW JERSEY.

APPARATUS FOR DEHYDRATING VISCOSE PRODUCTS.

Application filed June 21, 1926. Serial No. 117,365.

My invention relates to the manufacture of filaments, artificial hair, ribbons, etc., by projecting viscose (cellulose sulphocarbonate or thiocarbonate) through orifices into a coagulating medium, for instance, a bath containing chemicals in aqueous solution, which coagulate the viscose as semi-solid impure cellulose hydrate complexes. However, the process herein contemplated, which is generically claimed in my copending application Serial No. 105,944 filed May 1, 1926 for Letters Patent of the United States for improvement in processes of dehydrating viscose products, is applicable to such products of any form, including plane films and other webs.

Such viscose products are gelatinous and initially so soft an impressionable that they may be marred by handling and must be dehydrated and desiccated to render them firm enough in texture for commercial use. A very considerable portion of the cost of manufacture of such products is incurred in the ordinary process of eliminating the surplus moisture therefrom, which is effected by exposure to air either at, or above, atmospheric temperatures. Such desiccation is costly because of the length of time required to effect it, during which the viscose products must be supported in such position and relation as not to be marred by contact with each other, or otherwise. In other words, a vast extent of costly storage space and means must be employed to effect such ordinary dehydrating operations.

I have discovered that such viscose products may be almost instantaneously dehydrated to such a degree as to resist the stresses to which they are initially subjected in winding or otherwise disposing of them, immediately upon their emergence from the coagulating medium aforesaid, if they are then subjected to the dehydrating effect of an alcoholic environment, and preferably by surrounding them with an atmosphere of warm alcoholic vapor. That is to say, such viscose products may be dehydrated with far greater rapidity and at less cost, by subjecting them to the action of alcohol than by subjecting them to the action of atmospheric air or any other desiccating medium heretofore employed, and I find that the dehydrating effect of alcohol upon such products is much more rapid if the alcohol is in gaseous form than if it is in liquid form.

Moreover, the effect of such prior methods and means of manufacturing filamentous products is such that they are only capable of an average of eighteen per cent. elongation without fracture.

Therefore, it is the principal object and effect of my invention to provide viscose products capable of greater elongation, without fracture, than the normal products aforesaid, and the products of my present invention are in fact capable of at least one hundred per cent. elongation without fracture. Such products as herein contemplated are claimed in my copending application Serial No. 105,943 filed May 1, 1926 for Letters Patent of the United States for improvement in viscose products.

Such capacity for elongation is of great advantage in the use of such products in the formation of articles wherein they are subjected to unequal stresses in different regions or directions; for instance, in weaving such filaments in jacquard patterns for upholstery coverings and draperies and particularly for fabrics which are to be embossed, for instance, to form hat crowns and parts thereof in the millinery trade. It is to be particularly noted that the abnormal capacity for elongation characteristics of my improved products is not, strictly speaking, elasticity, for such products do not manifest any tendency to retract or return to their initial form after being stretched, but stay in the form to which they are extended. Consequently, such products may be embossed or otherwise deformed to any desired configuration, without allowance for any renitence thereof, as distinguished from the products of the prior art, which manifest such renitence.

Moreover, such a filament of the prior art is easily deformed by contact with itself in successive convolutions, and even slight indentations of the ultimate commercial filament, formed by drying and contraction from its primarily soft gelatinous form, are conspicuously noticeable because of the reflection of light therefrom; whereas, the commercial value of such a filament is largely dependent upon its uniformity of cross section and uniformly lustrous appearance. Therefore, my present invention has the further advantages that filaments produced therewith have such uniformity of cross section and uniformly lustrous appearance.

My invention includes the various novel features of construction and arrangement and procedure herein set forth, but the claims in this case are limited to apparatus whereby filamentous viscose products may be dehydrated without detrimental stresses and consequent deformation.

In said drawings; Fig. I is a vertical sectional view of a dehydrating apparatus embodying my invention. Fig. II is a vertical sectional view of a modified form of my invention.

I have found it convenient to form viscose by subjecting soda-cellulose to the action of carbon bisulphide, for instance, in the proportions of one hundred parts of the alkali-cellulose to ten parts of the carbon bisulphide, although a small excess of the latter is negligible. The cellulose sulphocarbonate thus formed is a loose mass, soluble in water, to form the liquid viscose. I then project the liquid viscose through suitable spinnerets into a coagulating bath, conveniently an aqueous solution containing fourteen per cent, of sodium bisulphite and one-fourth of one per cent, of tri-sodium phosphate. The coagulated filaments may be discharged from said bath in loose coils in any suitable containers in which they may be subjected to an alcoholic environment, for instance, in apparatus of the type claimed in my copending application Serial No. 105,945 filed May 1, 1926. However, any suitable method or means may be employed to render the filamentous viscose product sufficiently firm to be wound as herein contemplated, provided that it is not thereby detrimentally stretched preliminary to its treatment as herein contemplated; which treatment is designed and adapted to completely dehydrate such products without stretching them, so as to leave them with the abnormal capacity for elongation above contemplated.

I find it convenient to loosely wind the filaments 1 upon spools of hard rubber, of the shape shown in the drawing, each including a cylindrical tubular perforated barrel 2, two inches in diameter and five inches long, between end heads 3 which are four inches in diameter.

When such a spool is merely placed in an alcoholic environment, the dehydration effected by the latter proceeds contemporaneously centripetally inwardly from the outer convolutions of the helically coiled filaments, and centrifugally outwardly from the inner convolutions thereof, to which the dehydrating medium has access through the perforations in the spools. However, I prefer to effect such dehydration entirely centrifugally, so that as the filament progressively shrinks, the inner convolutions are first loosened, and the initial winding tension thereof relaxed, with the effect of avoiding the stretching of the filaments, which is inevitable when they are subjected to a dehydrating medium which is only accessible to the outer convolutions thereof for, in the latter case, the outer convolutions in shrinking must stretch over the inner convolutions which have not been shrunken or relaxed. However, regardless of any theory as to the precise operation of the method and means for dehydrations herein set forth; the effect thereof is to produce filaments which are distinguished from the filaments of the prior art by the advantageous capacity for abnormal elongation aforesaid, and also by their greater uniformity and brilliance and consequent commercial value.

Helical coils of filament 1, thus supported, may be subjected to an alcoholic environment, as shown in Fig. I, by placing them in the retort 5 having the removable lid 6. A dehydrating atmosphere may be generated in said retort from liquid alcohol 7 heated by steam, hot water, or any other suitable heating medium supplied to the pipe 8, which extends through the bottom of said retort and is closed by the cap 9.

Said retort 5 is provided with the removable closure 6; but the interior thereof is accessible for charging, exhausting or washing, without removal of said closure, by way of the pipe 11 controlled by the valve 12 and the pipe 14 controlled by the valve 15. The alcoholic vapor generated in said retort may be condensed by any suitable means. For instance, said retort may rest upon the subjacent container 16 through which cold water or other refrigerating means may be circulated by way of the pipe 18 controlled by the valve 19 and the pipe 20 controlled by the valve 21.

However, to effect dehydration of the filament coils 1 entirely centrifugally; so that the shrinkage of the filament proceeds from the inner convolutions outwardly in such coils; I prefer to employ the apparatus shown in Fig. II wherein the retort 23 is provided with the removable closure 24 and the pipe 25 controlled by the valve 26 through which the interior thereof may be charged, exhausted or washed. Said retort 23 has at the bottom thereof a series of dehydrating fluid inlets 27, conveniently branch pipes from a supply main 28 through which warm alcoholic vapor or other dehydrating fluid may be supplied under pressure. Each of said inlets is conveniently provided with a head 30 having a flange 31 and fitted to extend within the respective spool barrels 2 and beneath the heads 3 of said spools, which are thus supported in substantially fluid tight relation with said inlets.

For cooperation with the apparatus shown in Fig. II; said spools may be closed at their tops, conveniently by corks 29 so that dehydrating fluid supplied through said inlets 27 is forced through the perforations in the spool barrels 2 outwardly through the convolutions of the filaments 1 thereon. Said dehydrating fluid may be condensed upon the walls of said retort 23 and be withdrawn therefrom through said pipe 25 to be revaporized and returned through said inlets 27, or otherwise disposed.

I find it preferable to produce the alcoholic environment in said retort 5 by vaporizing ethyl hydroxid, $C_2H_5OH$, therein.

The process above described is so economical that fifty cubic centimeters of liquid alcohol is sufficient to completely dehydrate four dry pounds of the filament. However, it is to be understood that the ordinary alcohol above specified is preferable only by reason of its low cost, as the higher alcohols act even more energetically and, therefore, it is to be understood that my invention includes the utilization of any alcoholic liquid or vapor for the purpose described.

Although I find it convenient to use apparatus constructed and arranged as above described, I do not desire to limit myself thereto, as it is obvious that various modifications may be made therein, without departing from the essential features of my invention, as defined in the appended claims.

I claim:

1. In apparatus for dehydrating viscose products; the combination with a retort having a removable lid; of a conduit projecting upwardly in the bottom of said retort; an annular spool seat fixed in said retort in coaxial relation with said conduit, and means for condensing dehydrating fluid and precipitating the same in said retort, including a subjacent refrigerant container; whereby the dehydrating fluid may be condensed to liquid form in the bottom of said retort before removing the retort lid; to thus prevent loss of said fluid by dissipation when said lid is removed.

2. In apparatus for dehydrating viscose products; the combination with a retort having a removable lid; of heating means for said retort; an annular spool seat fixed in said retort in coaxial relation with said heating means; and means for condensing dehydrating fluid and precipitating the same in said retort, including a refrigerant container; whereby the dehydrating fluid may be condensed to liquid form in the bottom of said retort before removing the retort lid; to thus prevent loss of said fluid by dissipation when said lid is removed.

In testimony whereof, I have hereunto signed by name at Burlington, New Jersey, this 17th day of May, 1926.

SAMUEL A. NEIDICH.